US010018973B2

(12) United States Patent
Langejürgen (10) Patent No.: US 10,018,973 B2
(45) Date of Patent: Jul. 10, 2018

(54) ARRANGEMENT WITH AN ELECTROMOTIVE FURNITURE DRIVE AND A DATA DEVICE; METHOD FOR ESTABLISHING A COMMUNICATION CONNECTION BETWEEN THE ELECTROMOTIVE FURNITURE DRIVE AND THE DATA DEVICE; AND A CORRESPONDING FURNITURE DRIVE (71) Applicant: DewertOkin GmbH, Kirchlengern (DE)

(72) Inventor: Stefan Langejürgen, Vlotho (DE)

(73) Assignee: DEWERTOKIN GMBH, Kirchenlengern (DE)

( * ) Notice: Subject to any disclaimer, the term of this patent is extended or adjusted under 35 U.S.C. 154(b) by 555 days.

(21) Appl. No.: 14/358,282

(22) PCT Filed: Nov. 15, 2012

(86) PCT No.: PCT/EP2012/072773
§ 371 (c)(1),
(2) Date: May 15, 2014

(87) PCT Pub. No.: WO2013/072431
PCT Pub. Date: May 23, 2013

(65) Prior Publication Data
US 2014/0303786 A1    Oct. 9, 2014

(30) Foreign Application Priority Data
Nov. 15, 2011  (DE) .................. 10 2011 055 362

(51) Int. Cl.
G05B 15/02    (2006.01)
G05B 19/042   (2006.01)
(Continued)

(52) U.S. Cl.
CPC .......... *G05B 15/02* (2013.01); *A47C 20/041* (2013.01); *A47C 31/008* (2013.01);
(Continued)

(58) Field of Classification Search
CPC ............... G05B 15/02; G05B 19/0426; G05B 2219/23363; G05B 2219/25061;
(Continued)

(56) References Cited

U.S. PATENT DOCUMENTS 8,351,680 B2    1/2013  Kalteis
2002/0057289 A1*  5/2002  Crawford .............. G06Q 30/06
715/744

(Continued)

FOREIGN PATENT DOCUMENTS

CN    101917950 A    12/2010
DE    196 03 318    8/1997
(Continued)

OTHER PUBLICATIONS

Langejürgen, U.S. Pat. No. 8,483,848, Jul. 9, 2013, 2008-0291046, Nov. 27, 2008.

(Continued)

Primary Examiner — Umut Onat
(74) Attorney, Agent, or Firm — Henry M. Feiereisen LLC (57) ABSTRACT An arrangement is disclosed having an electromotive furniture drive with a control device, a power supply device, and at least one operating device; a piece of furniture into which the electromotive furniture drive is installed; and a data device, the electromotive furniture drive and the data device are in communicative connection with each other. The communication connection between the electromotive furniture drive and the data device has a first transmission path, which is provided for transmitting an identification code of (Continued)

the electromotive furniture drive, and a second transmission path, which is provided for transmitting control data and/or operating data of the electromotive furniture drive. There is further disclosed a method for establishing a communication connection between an electromotive furniture drive and the data device.

19 Claims, 3 Drawing Sheets

(51) Int. Cl.
*A47C 20/04* (2006.01)
*A47C 31/00* (2006.01)

(52) U.S. Cl.
CPC .. *G05B 19/0426* (2013.01); *A61H 2201/0138* (2013.01); *A61H 2201/5015* (2013.01); *A61H 2201/5025* (2013.01); *A61H 2201/5041* (2013.01); *A61H 2201/5046* (2013.01); *G05B 2219/23363* (2013.01); *G05B 2219/25061* (2013.01); *G05B 2219/25076* (2013.01); *G05B 2219/25101* (2013.01); *G05B 2219/2608* (2013.01)

(58) Field of Classification Search
CPC ........... G05B 2219/25076; G05B 2219/25101; G05B 2219/2608; A47C 20/041; A47C 31/008; A61H 2201/0138; A61H 2201/5015; A61H 2201/5041; A61H 2201/5025; A61H 2201/5046
See application file for complete search history.

(56) References Cited

U.S. PATENT DOCUMENTS

| | | |
|---|---|---|
| 2003/0044068 A1 | 3/2003 | Kagehiro et al. |
| 2005/0256939 A1 | 11/2005 | Naismith et al. |
| 2006/0135064 A1 | 6/2006 | Cho et al. |
| 2008/0092292 A1* | 4/2008 | Rawls-Meehan .... A47C 20/041 5/600 |
| 2008/0109654 A1 | 5/2008 | Hadacker et al. |
| 2010/0109848 A1* | 5/2010 | Blair ...................... A61G 13/10 340/10.2 |
| 2011/0037425 A1 | 2/2011 | Gehrke et al. |
| 2011/0081860 A1 | 4/2011 | Brown et al. |
| 2011/0114716 A1* | 5/2011 | Pratt ................... H04L 12/2814 235/375 |
| 2015/0130586 A1 | 5/2015 | Rawls-Meehan |

FOREIGN PATENT DOCUMENTS

| | | |
|---|---|---|
| DE | 102006051014 | 4/2008 |
| EP | 0 434 986 | 7/1991 |
| WO | WO 2007/113883 | 10/2007 |

OTHER PUBLICATIONS

International Search Report issued by the European Patent Office in International Application PCT/EP2012/072773 dated Dec. 20, 2012.

* cited by examiner

ARRANGEMENT WITH AN ELECTROMOTIVE FURNITURE DRIVE AND A DATA DEVICE; METHOD FOR ESTABLISHING A COMMUNICATION CONNECTION BETWEEN THE ELECTROMOTIVE FURNITURE DRIVE AND THE DATA DEVICE; AND A CORRESPONDING FURNITURE DRIVE

CROSS-REFERENCES TO RELATED APPLICATIONS

This application is the U.S. National Stage of International Application No. PCT/EP2012/072773, filed Nov. 15, 2012, which designated the United States and has been published as International Publication No. WO 2013/072431 and which claims the priority of German Patent Application, Serial No. 10 2011 055 362.2, filed Nov. 15, 2011, pursuant to 35 U.S.C. 119(a)-(d).

BACKGROUND OF THE INVENTION

The invention relates to an arrangement having an electromotive furniture drive and a data device. The invention also relates to a method for establishing a communication connection of the electromotive furniture drive to the data device, and to a corresponding electromotive furniture drive.

Such an arrangement is used, for example, for data transmission between a data device, which is a programming device, for example, and an electromotive furniture drive of a piece of furniture. In this manner, operations such as reprogramming, program changes, auxiliary programming, parameter settings, parameter changes, etc., of a control program of the electromotive furniture drive can be performed. The programming device can also be a computer.

The data device is typically coupled, instead of a manual control, which is also referred to as an operating apparatus, to the electromotive furniture drive, i.e., to its controller, via a plug connection. For this purpose, a cable pullout safeguard of the plug connection of the manual control is detached, the plug of the manual control is removed from the plug connection on the controller, and a plug of the data device is inserted into the plug connection on the controller. Other controllers have a separate plug connection only for data devices. These plug connections are unused in normal operation, however, so that they must be protected accordingly against the penetration of moisture and dust. Relevant regulations define corresponding covers and seals for this purpose, which must possibly also be fastened in a specific manner. These covers and seals are to be removed to use the data device and are to be closed again according to the regulations after usage.

DE 196 03 318 A1 illustrates an example of this with a description of a control system for electromotively actuable adjustment apparatuses for hospital beds. In this case, a programming device, for example, a laptop, can temporarily be connected using a cable to the bed controller and used for maintenance purposes.

In the case of such arrangements, in which multiple pieces of furniture are set up in direct proximity to one another, for example, in hospitals, nursing homes, showrooms, it can be possible that so-called multimedia devices are used as data devices. These can have operating elements as touch switches (touch screens), which are connectable to the respective electromotive furniture drive instead of an existing manual control by means of a matching cable.

Electromotive furniture drives are known in many different embodiments. They are implemented as linear drives having a linearly adjustable output element or as rotation drives having a rotating output element and have proven themselves very well in practice. The linear drives have one or a number of electric motors, wherein a speed-reducing gear is connected downstream from each motor and a further gear, for example, in the form of a threaded spindle gear, is connected downstream from the speed-reducing gear, which generates a linear movement of the output element from the rotational movement of the motor. The rotation drives have at least one speed-reducing gear connected downstream from the respective electric motor, wherein the last gear element forms the output element. The output element of the respective electromotive furniture drive is connected to a fixed and/or to a movable furniture component, so that during operation of the electric motor, the movable furniture components are adjusted relative to one another. The furniture can be implemented as a slatted frame, worktable, bed, reclining surface, treatment table, hospital bed or health care bed, and also as a lifting unit for persons such as lifters or patient lifters.

It is routine to provide such electromotive furniture drives with a so-called network circuit breaker, which more or less disconnects it from the electrical supply network in the event of nonuse. For operation of such a network circuit breaker, a so-called auxiliary voltage source is necessary, which provides electrical energy for switching over or at least initiating a switchover from a turned-off idle state into a turned-on operating state to trigger the switch signals.

Further consumers which are connectable to a control device of the electromotive furniture drive are, inter alia, massage drives, heaters, lights, etc. The operating apparatus can be implemented via a wired or wireless (radio/infrared) bidirectional transmission path. Bidirectional means that the operating apparatus can not only conduct control signals to the control device, but rather also can receive signals on the part of the control device, for example.

Operating apparatuses having a full graphic display (display apparatus) and having burned-in (hardware-technology) images are known. The full graphic display displays various images and functions to the consumer.

SUMMARY OF THE INVENTION

The object of the invention is to provide an improved arrangement having an electromotive furniture drive and a data device.

The object is achieved by the subjects of the independent claims.

Accordingly, an arrangement comprises an electromotive furniture drive having a control device, a power supply apparatus, and at least one operating apparatus; a piece of furniture, in which the electromotive furniture drive is installed; and a data device, wherein the electromotive furniture drive and the data device have a communication connection. In this case, the communication connection between the electromotive furniture drive and the data device has a first transmission path, which is provided for transmitting an identification code of the electromotive furniture drive, and a second transmission path, which is provided for transmitting control data and/or operating data of the electromotive furniture drive.

The term "communication connection" is to be understood as a data exchange, wherein data are transmitted from the data device to the electromotive furniture drive and vice versa. These data can be, for example, parameter data, operating data, limiting value data, program data (software), etc., and also control data for controlling the electromotive furniture drive. Other data or the operating data can relate to the wear of the electromotive furniture drive. The data corresponding to wear can also be calculated or determined from the operating data and/or from the data mentioned at the outset, however.

A method according to the invention for establishing a communication connection between an electromotive furniture drive of a piece of furniture and a data device of an arrangement is characterized by the following method steps: (S1) providing an identification code of the electromotive furniture drive of the piece of furniture by means of an identification apparatus of the electromotive furniture drive; (S2) transmitting the identification code provided by the identification apparatus via a first transmission path between the identification apparatus and a communication apparatus of the data device; (S3) identifying the electromotive furniture drive by checking the received identification code; and (S4) establishing the communication connection between the electromotive furniture drive and the communication apparatus of the data device and using a second transmission path between the electromotive furniture drive (2) and the communication apparatus of the data device.

The communication connection having two transmission paths advantageously allows a data device not only to be usable for maintenance, service, and diagnosis with the electromotive furniture drive, but rather also a data device, for example, a multimedia device, to be usable for operating purposes.

In addition, devices are defined as multimedia devices which have an input unit, for example, in the form of a touch screen or a keyboard, and which also have an output unit, for example, in the form of a monitor or a display screen and which at least have a capability for optical, electromagnetic, or electrical transmission of data sets. Multimedia devices can be implemented as portable and electrically independent from the power supply network and are implemented, for example, as a smart phone or as a cellular telephone or as a mobile wireless telephone.

A data device for operating purposes is therefore provided if the motors or other components of the electromotive furniture drive can be operated thereby, so that, for example, the adjustment drive which adjusts the piece of furniture can be turned on or off. The definition may also be explained in reverse, if an operating device for data purposes can control the respective piece of furniture, therefore, can thus turn on or off the respective adjustment drive of the furniture or other electrical components of the furniture or can at least retrieve its status.

By means of the first transmission path it is possible to perform an identification of the electromotive furniture drive for an unambiguous assignment. After the recognition of the identification code, the data device automatically synchronizes with only this electromotive furniture drive corresponding to the identification code. The communication connection for a data exchange is only established and released when this identification has been performed and the electromotive furniture drive is unambiguously recognized in this manner.

In one embodiment, it is provided that the first transmission path is implemented as wireless, and the second transmission path is implemented as at least partially wireless. It is thus possible that no new cable connections are to be installed. Existing terminals of manual controls are not to be changed. Due to the wireless embodiment of the transmission paths, comfortable setup of the arrangement can be performed, because the previously typical cumbersome coupling can be omitted. Thus, neither is an existing cable connection disconnected nor is a separate line removed again.

In the case in which, for example, in a hospital, multiple pieces of furniture are in direct proximity to one another, all data devices and all pieces of furniture or all electromotive furniture drives, respectively, are ready to receive signals in a wireless manner. However, since the communication connection uses two transmission paths, namely one for identification and one for data transmission, an unambiguous assignment occurs between data device and electromotive drive to be assigned.

Furthermore, it is provided that at least one of the two transmission paths is implemented as bidirectional, whereby a data exchange can occur in both directions. In a simplified and preferred form, however, at least one of the transmission paths is implemented as a unidirectional transmission path.

In a further embodiment, the first transmission path and the second transmission path are arranged between the electromotive furniture drive and a communication apparatus connected to the data device. Those transmission paths can thus be combined with their associated components in one apparatus.

It is provided that the electromotive furniture drive is equipped with an identification apparatus for the first transmission path and with a transmission apparatus for the second transmission path, wherein the communication apparatus has an identification unit for the first transmission path and a transmission unit for the second transmission path. The transmission paths can thus be unambiguously assigned.

In still a further embodiment, it is provided that the identification apparatus is arranged on and/or in the operating apparatus or an and/or in a part of the electromotive furniture drive. A versatile attachment can thus be performed.

In another embodiment, the identification apparatus is assigned to a piece of furniture. This is performed in the simplest manner as mentioned above, since the operating apparatus or the electromotive furniture drive is assigned to the piece of furniture. Other embodiments, wherein the identification apparatus is assigned to the piece of furniture, are implemented as connectable to the piece of furniture. These can be connected to an item of information about the patient, for example, to his name. The electromotive furniture drive is typically a fixed component of the piece of furniture. Other identification apparatuses are indirectly assigned to the piece of furniture, in that they are assigned to a patient, for example, in the form of a patient wristband, a patient data carrier, or the patient file.

In one embodiment, the identification unit is applied and/or attached as an identification code by laser engraving, imprinting, an imprinted or embossed sticker, cutting shaping, reshaping (embossing), molding (injection molding in the case of an injection molded housing), color sequence, and/or color spectrum. In this embodiment, the identification code is implemented as an optically readable or as an optically recognizable identification code. The identification code can be recorded and imaged, for example, by an integrated camera (webcam of the data device). If the identification cutting incorporation is arranged on the manual control of the electromotive furniture drive, the manual control can be held in front of the camera, for example. The identification code contains, for example, the progressive serial number of the controller of the electromotive drive (or at least the serial number of a component of the drive set, or a unique identifier of the controller).

Other identification codes can be implemented as a barcode, as a matrix code, or as a grid code, for example, as a barcode, target code, or as a two-dimensional code/data matrix.

In principle, identification codes are used which are externally visible. This comprises identification codes which are connected or form a connection to the operating apparatus, to the electromotive furniture drive, to an electrical connecting line, to the piece of furniture, or to a patient. Such connections can be mechanical connections or are, with the exception of the patient, integrally joined connections. Visible means that the identification code can be perceived using the human eye. Other embodiments of a visible identification code are invisible to the human eye and can only be perceived by an artificial eye, for example, by a camera or by a scanner.

Other identification codes are imaged in electronic form and embodied using electrical identification apparatuses, which comprise electromagnetic, electromechanical, magnetic, or capacitive identification apparatuses. These are described hereafter as electrical identification apparatuses. Electrical identification apparatuses are embodied, for example, as RFID apparatuses or as magnetic strips. In one embodiment, they are arranged inside a housing, which forms the housing of the manual control or of the electromotive furniture drive, for example. Other electrical identification apparatuses are connected to the patient or to the piece of furniture, as described above. Such connections can be mechanical connections, as described at the outset.

Therefore, for example, barcode stickers, numbered stickers, RFID stickers, RFID circuits, bed clips, patient cards, patient wristbands come into consideration as practical embodiments of identification apparatuses. An RFID sticker is a multilayered object which has an electrical RFID circuit and can be installed by means of an adhesive film. An RFID circuit can be a component of a circuit board of an electromotive furniture drive or an operating element or an operating apparatus.

It is also possible that the camera is arranged in a separate part of the communication unit and is guided by an operator to the identification apparatus to read the identification code.

In an alternative embodiment, the identification apparatus has a stored data value of an identification code and is implemented for an output of the identification code as an optical signal by means of a transmission element. A display light of the manual control can thus also be used, for example. In this embodiment, the display light or a predetermined display light is operated by an upstream microcontroller as a type of flashing light, which is perceived as a continuously lighted display light by the human eye, however. The turning on and off of the display light carries the analyzable information for the identification. An LED comes into consideration as the display light, which optically displays the status of a storage battery or the operation of an adjustment drive to the user, for example.

In one embodiment, the first transmission path is arranged between the identification apparatus and the identification unit, wherein the second transmission path is arranged between the transmission apparatus and the transmission unit. The transmission paths therefore run practically in parallel to one another at different locations. However, they are operated successively, since firstly the first transmission path is operated for the identification and then the second transmission path is operated for the data exchange.

It is provided that the first transmission path is an optical transmission path, and the second transmission path is a radio path. "Optical" transmission path is also to be understood to mean that the identification code is readable both by an optical device, i.e., by machine, and also by the human eye.

In an alternative embodiment, the first transmission path and the second transmission path are arranged between the identification apparatus and the identification unit. The identification unit is used by the transmission unit.

In this case, the first transmission path and the second transmission path form a shared optical transmission path. However, the transmission paths are operated successively. Components may thus be saved.

In still a further embodiment, the communication apparatus is implemented as a separate auxiliary part. This can be, for example, a USB stick, whereby a simple connection to the data device is possible. The auxiliary part can be prepared independently from the data device.

In an alternative embodiment, the communication apparatus is at least partially integrated in the data device. Existing functions of the data device can thus also be used.

In still a further embodiment, the electromotive drive has an acquisition apparatus for acquiring operating data of the electromotive drive.

In a further embodiment, the data device is a multimedia device having a touch screen. The data device can thus also be used as an operating device.

In another embodiment, the provision of the identification code is performed automatically or in a menu-controlled manner by the data device. The operator can start a corresponding program on the data device.

If the transmission in method step (S2) occurs optically, multiple possibilities are provided for the transmission, wherein in one embodiment, imaging of the identification code is performed by means of an optical device. It is also possible that reading of the identification code is performed by a user and input is performed by means of a keyboard, for example, if no reading device is present or an existing one does not function (e.g., weak battery).

In an alternative embodiment, transmission of the identification code is performed by means of light signals. This can be performed particularly rapidly, wherein an incorrect transmission of the identification code can be extremely improbable.

The light signals can be in the visible range or in the infrared range. The light signals are ideally visible to the human eye and are generated by an electrical light source, which is implemented as an LED in one embodiment. The electrical light source is switched/controlled by a control unit of the electromotive furniture drive or the operating apparatus. The electromotive furniture drive, the piece of furniture, or the operating apparatus ideally comprises the electrical light source. The light is turned on and off in an encrypted type of a serial data transmission, which forms the identification code. For this purpose, in one embodiment, the operating apparatus or the electromotive furniture drive can have a separate light source. In a preferred embodiment of the light source, it is formed by an existing monitoring light of the operating apparatus or the electromotive furniture drive. The light source can be turned on and off sufficiently rapidly that it is not perceptible by the human eye. Typical turning-off times of the light are in the range from 5 to 50 ms.

An electromotive furniture drive of the above-described arrangement is equipped with an identification apparatus for a first transmission path of the communication connection and with a transmission apparatus for a second transmission path of the communication connection.

The data exchange in the communication connection can be performed extraordinarily simply, since the transmission via the second transmission path occurs in one embodiment via radio. Corresponding modules which are available cost-effectively at high quality on the market, can be used as the radio transmitter. However, it is also possible that radio standards such as Bluetooth or WLAN are applied. A communication connection to a mobile data device, for example, mobile telephone, smart phone, laptop, palmtop, or iPad can thus be performed.

BRIEF DESCRIPTION OF THE DRAWING

Further characteristics and features result from the following description of a preferred exemplary embodiment and are the subject matter of further dependent claims.

The invention will be explained in greater detail on the basis of the appended drawings. In the figures.

DETAILED DESCRIPTION OF PREFERRED EMBODIMENTS

Figure 1:
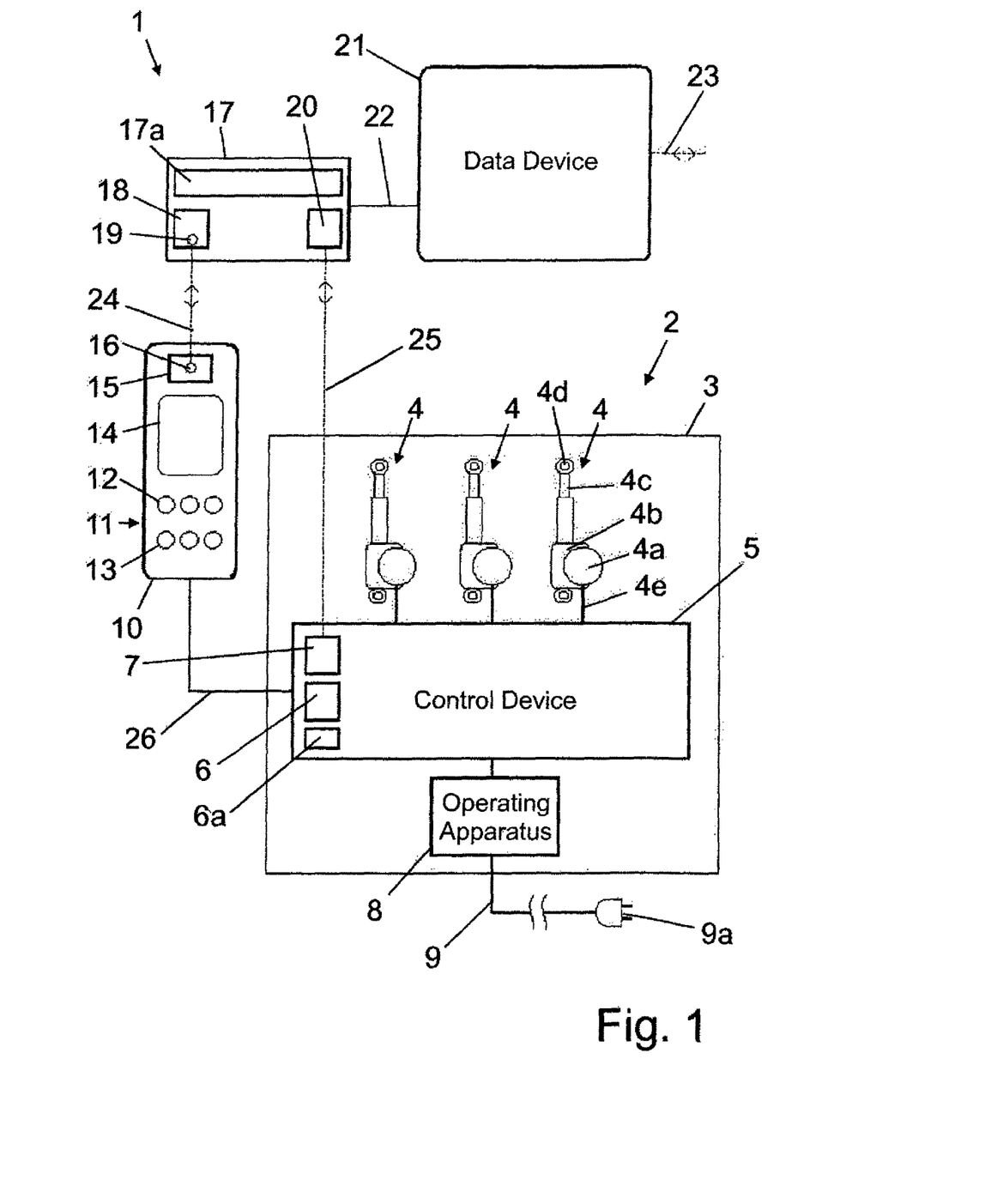
FIG. 1 shows a schematic block diagram of an exemplary embodiment of an arrangement according to the invention having a first exemplary embodiment of an electromotive furniture drive according to the invention.

FIG. 1 shows a schematic block diagram of an exemplary embodiment of an arrangement 1 according to the invention having an exemplary embodiment of an electromotive furniture drive 2 according to the invention.

The arrangement has here the electromotive furniture drive 2, a piece of furniture 3, which is only schematically indicated by a rectangular box, and a data device 21.

The electromotive furniture drive 2 is assigned to the piece of furniture 3, which is a hospital bed or health care bed in the arrangement 1 of this exemplary embodiment. For this purpose, the electromotive furniture drive 2 is embodied in a type of intellectual property protection corresponding to the use, which will not be described in greater detail here, however.

Other types of furniture have already been mentioned at the outset, are not shown in greater detail in the figures, and can therefore be implemented as an armchair, couch, conventional household bed, or as a slatted frame. Types similar to furniture, wherein the arrangement 1 can certainly be used, however, are formed by rehabilitation devices such as patient lifters or bathtub lifters or the like, but also fall under the definition of furniture, since they are implemented as furnishings, i.e., as fixtures predominantly in interiors.

The data device 21 can be, for example, a read device, a write device (programming device), mobile telephone, laptop, etc., or a mobile device in general. In this exemplary embodiment, the data device 21 is a multimedia device in a patient room of a hospital and/or nursing home, wherein this multimedia device is attached above the piece of furniture 3 implemented as a hospital bed and/or health care bed, for example, over its foot part on a wall or hanging down from the ceiling. This multimedia device is also equipped as a data device 21 in this example with a display screen and a touch screen. i.e., the operation of the electromotive furniture drive 2 of the piece of furniture 3 can be performed by the data device 21 when a communication connection is established between the data device 21 and the electromotive furniture drive 2.

This communication connection has a first transmission path 24 and a second transmission path 25. Firstly, an identification of the electromotive furniture drive 2 is performed via the first transmission path 24. After completed identification, a data exchange is carried out with the electromotive furniture drive 2 via the second transmission path 25. This will be described in detail hereafter.

The data device 21 is connected via a connection 22 to a communication apparatus 17. The communication apparatus 17 is used to establish and operate the communication connection between the data device 21 and the electromotive furniture drive 2. The first transmission path 24 and the second transmission path 25 are arranged between the communication apparatus 17 and the electromotive furniture drive 2, and will be described in greater detail hereafter together with the communication apparatus 17.

The data device 21 is additionally connected here via a bidirectional terminal 23 to an intranet and/or the Internet or another data network. Thus, for example, remote maintenance of the electromotive furniture drive 2 can be performed via the Internet when the communication connection is established.

The term "data exchange" is to be understood not only as readout, transmission, and writing of data values, for example, operating data of the electromotive furniture drive 2, but rather also a transmission of data values of control data, which contain control commands for the electromotive furniture drive 2. In this manner, the data device 21 can be used in the embodiment as a multimedia device having touch screen for operating the electromotive furniture drive 2 of the piece of furniture 3. Possible operating restrictions for a patient who can be located in the piece of furniture 3 implemented in the example as the hospital/health care bed, due to corresponding apparatuses, which will not be described here, can be possible.

In this exemplary embodiment, the electromotive furniture drive 2 comprises three adjustment drives 4 implemented as linear drives, a control device 5, a power supply apparatus 8, and an operating apparatus 10.

One construction of the adjustment drives 4 is shown on the right adjustment drive 4 having reference signs as representative of the others. The adjustment drives 4 have, depending on the rotational direction of an electric motor 4a (not shown in greater detail), a housing 4b, and an extendable and retractable lifting pipe 4c, on the free end of which an attachment part in the form of a fork head 4d is attached. A further attachment part, for example, also in the form of a further fork head (not shown) is fastened on the housing 4b of the adjustment drive 4. The respective attachment part is respectively connected in a way not shown in greater detail to a furniture component of the piece of furniture 3, so that upon operation of the electric motor 4a, the furniture components respectively attached to the adjustment drive 4 move relative to one another. The three adjustment drives 4 are connected to the control device 5 by means of motor connection lines 4e. The respective connection can be embodied, for example, by means of plug connectors in different types of intellectual property protection, for example, spray water protection.

Figure 2:
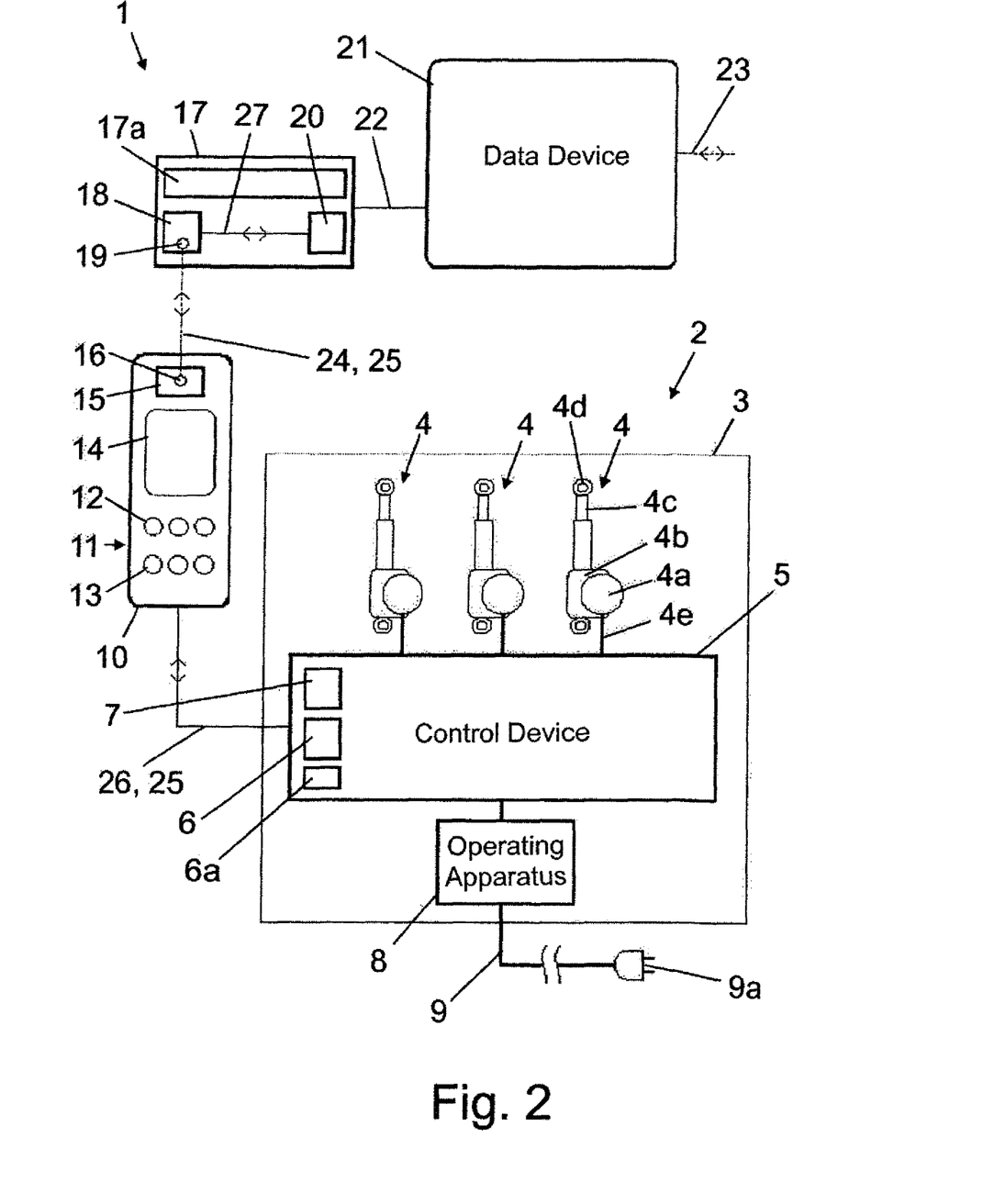
FIG. 2 shows the schematic block diagram according to FIG. 1 having a second exemplary embodiment of the electromotive furniture drive according to the invention.

The control device 5 is shown in FIGS. 1 and 2 as a rectangular block and has multiple apparatuses, not all of which are shown here. Thus, for example, one apparatus thereof is identified as a motor controller, which can be implemented as a relay controller having relay switches and/or as a semiconductor circuit having semiconductor switches. Furthermore, a so-called controller, for example, a microcomputer, can be provided, which has associated control software and one or more memories.

The control device 5 additionally comprises an acquisition apparatus 6 having a storage apparatus 6a, and a transmission apparatus 7.

The acquisition apparatus 6 acquires operating data of the electromotive drive 2 and stores it either completely or selectively, for example, in a time-dependent, load-dependent, calculated, or estimated manner, in the storage apparatus 6a.

The term "operating data" is to be understood, for example, in the simplest case as the frequency of exceeding the turning-on duration of a respective adjustment drive 4. Furthermore, other data can be acquired, which, as further operating data, represent an image of the overall performed operation of the electromotive drive 2, for example, maximum operating duration, average operating duration, maximum load/power consumption, average power consumption, values for the analysis of wear calculated from the data, etc. In addition, data on the operation of the drive can also come in to consideration for the operating data, for example, control software, individual control programs, control parameters, etc.

The transmission apparatus 7 is used, when the communication connection is established, for data exchange of the operating data, for example, the stored data in the storage apparatus 6a and in other memories of the control device 5, and for data exchange of control data for operating the electromotive furniture drive 2 via the communication apparatus 17 with the data device 21, which will be explained in detail hereafter. Thus, not only can operation of the electromotive furniture drive 2 be performed in a simple manner via the data device 21, but rather also a readout of service data, which are stored in the storage apparatus 6a and in other memories of the control device 5, when the communication connection is established. The respective associated data exchange can also be performed bidirectionally, i.e., the transmission apparatus 7 is implemented both for transmitting and also for receiving data, for example, control data, limiting values, setting values, software, etc., for controlling the electromotive furniture drive 2, and for writing in the storage apparatus 6a and in other memories of the control device 5. The data exchange will be explained in greater detail hereafter.

Furthermore, the control device 5 is coupled to the operating apparatus 10, which will be described in greater detail hereafter, via a control connection 26. The control connection 26 can be embodied as a wired connection and/or a wireless connection, for example, as a radio link or infrared link. In this exemplary embodiment, the control connection 26 is implemented as bidirectional and wirebound. A connection of the control connection 26 to the control device 5 is a plug connection here, for example, in a suitable type of intellectual property protection.

The power supply apparatus 8 is electrically connected to the control device 5 and is implemented, for example, having an isolating transformer, rectifier, and filter circuit or as a switched-mode power supply. The power supply apparatus 8 is connected according to the illustration according to FIG. 1 via a network cable 9 to a network plug 9a, wherein in another embodiment (not shown in greater detail), the network plug 9a can be arranged on a network circuit breaker (also not shown). In another embodiment, this network circuit breaker can be integrated in the power supply apparatus 8. It is also to be noted that the power supply apparatus 8 is then provided according to the illustration according to FIG. 1 with an enclosing housing, so that the network plug 9a can be attached or molded on the housing.

In a refining embodiment (not shown in greater detail, however), the power supply apparatus 8 is inserted into the housing of the control device 5 or a housing 4b of the adjustment drives 4 or attached thereon, wherein one or two of the adjustment drives 4 can be constructed like a double drive (not shown in greater detail), wherein at least one electric motor 4a, but preferably two electric motors 4a can be accommodated in a shared housing.

The operating apparatus 10 comprises in this exemplary embodiment at least one operating section 11 having switch operating elements 12, 13, a display apparatus 14, and an identification apparatus 15. These components are arranged in or on a housing (not shown in greater detail) of the operating apparatus 10.

A further embodiment (not shown in greater detail) of the arrangement 1 provides a network-independent power supply in the form of a storage battery. This can be arranged additionally to the power supply apparatus 8 and electrically connected thereto, however, it can also replace the power supply apparatus 8 in a further embodiment. A relatively small construction of a power supply apparatus 8 is then required, however, which is implemented as a charging device of the storage battery.

By means of the operating apparatus 10, the relay switches or the semiconductor switches of the control device 5 and therefore the adjustment drives 4 can be turned on and off, for example, via control currents, wherein the power switches of the relay switches or the semiconductor switches switch the high motor current of the respective adjustment drive 4.

The respective functions, for example, adjusting an adjustment drive 4 in one direction and in the opposite direction, can be actuated using the switch operating elements 12 and 13 of the operating section 11 of the operating apparatus 10. Further switch operating elements 12, 13 can also be provided for other functions and consumers (not shown), for example, heaters, lights, and the like of the electromotive furniture drive 2 of the piece of furniture 3. The switch operating elements 12, 13 can be implemented as separate switch elements, for example, film switches or electromechanical switches/buttons, and/or on the display apparatus 14 as touch switches (touch screen switches).

The control device 5 of the electromotive furniture drive 2 of the piece of furniture 3, which is a hospital/health care bed in this exemplary embodiment, can additionally be connected to a further so-called lockout box, which is only usable by authorized personnel (health care personnel), using which control functions can be blocked and released for the user, which is not described in greater detail here.

The display apparatus 14 can be, in a simple embodiment, only an optical report display, for example, a light-emitting diode, for a respective turned-on or blocked function, for example. However, it is also possible that the display apparatus 14 is implemented as a full graphic display screen and/or a display screen, for example, having burned-in images. A simple report display can additionally be provided as a light-emitting diode, for example.

The identification apparatus 15 has an identification code of the electromotive furniture drive 2 of the piece of furniture 3 and is used for the unambiguous identification of the electromotive furniture drive 2 of the piece of furniture 3 to establish the communication connection of the electromotive furniture drive 2 of the piece of furniture 3 to the data device 21. The communication connection to the data device 21 is carried out by the communication apparatus 17 in conjunction with the identification apparatus 15 and the transmission apparatus 7.

In a first, simple variant, the identification apparatus 15 has a permanent, optical identification code, which is visible and/or machine-readable. The term "visible" is also to be understood to mean that the identification code is also only visible in a specific wavelength range, for example, only in the infrared range, but is readable using a corresponding tool, wherein the identification code is then not visible to the human eye. The identification code can be formed by infrared light signals, wherein a special or a standardized transmission protocol, for example, according to the IrDA standard (Infrared Data Association) is used in a simplified manner.

The identification code contains, for example, the running serial number of the electromotive furniture drive 2 or its control device 5 for assignment of the respective data of the data exchange to the respective furniture drive 2 or its control device 5. The identification code can also have another character sequence alternatively or additionally to the serial number.

For this purpose, the identification apparatus 15 of this first variant is attached to the operating apparatus 10 in a suitable manner. This can be, for example, on the surface of the housing of the operating apparatus 10, wherein an application is possible by laser engraving, imprinting, an imprinted or embossed sticker, cutting shaping, reshaping (embossing), molding (injection molding in the case of an injection molded housing), color sequence, color spectrum, etc.

The attachment location of this first variant of the identification apparatus 15 is arranged in this example on the housing of the operating apparatus 10. However, it can also be arranged on its suspension (hooks) or in general on the housing of a component of the electromotive furniture drive 2 (operating apparatus 10, control device 5, adjustment drive 4, cable [control connection 26, network connection cable 9, motor connection line 4c], connecting linkage, etc.).

The identification code of this first variant of the identification apparatus 15 can also be arranged and/or attached on a component (for example, in the service documents) associated with the electromotive furniture drive 2 and/or the piece of furniture 3.

A second variant of the identification apparatus 15 has a transmission element 16. The transmission element 16 is implemented in this exemplary embodiment as a lighting means, for example, a light-emitting diode (LED). In an alternative embodiment, the display apparatus 14 in the simple embodiment as an optical report display, for example, as a light-emitting diode, can be used as the transmission element 16. The identification code is stored in this variant in the identification apparatus 15 as a stored data value. It is also possible that the identification apparatus 15 is implemented for the purpose of reading out the identification code as a stored data value from a memory of the control device 5 or the storage apparatus 6a.

In another manner, the display apparatus 14 can be implemented as the transmission element 16. A full graphic display screen can be provided as the display apparatus 14 in this case, which brings a barcode or a two-dimensional matrix code to optical display, wherein the display apparatus 14 can be implemented as an LCD display without background illumination, but in a preferred embodiment has a lighting apparatus, or a display apparatus 14 as a full graphic display screen is embodied as self-lighting.

An essential advantage of the optical transmission path and the optical identification apparatus 15 and also of the optical transmission element 16 is still to be mentioned. The direction and the intensity of these transmission paths may be determined and configured very easily. A transmission element 16 implemented as a yellow light-emitting diode, for example, generally has a small light emission angle and generally has a low luminosity, so that the data it transmission originating therefrom naturally has a short range of approximately 10 cm. For this purpose, a range reducing component, for example, in the form of a resistor or another type of component having voltage limiting properties, can also be connected upstream of the light-emitting diode. The essential advantage is that another similar piece of furniture, which is set up nearby the piece of furniture 3, is excluded from the identification and only the piece of furniture 3 is identified.

The data value of the identification code which is stored or read out by the identification apparatus 15 is then adapted by the identification apparatus 15 so as to output it as an optical signal, for example, a sequence of optical brightness pulses, by means of the transmission element 16.

The identification code provided by the identification apparatus 15 is transmitted via the first transmission path 24 to the communication apparatus 17 of the data device 21. The communication apparatus 17 comprises here a communication control unit 17a, an identification unit 18 having an identification element 19, and a transmission unit 20.

The identification element 19 is implemented to read the identification code provided by the identification apparatus 15.

The type of the identification code can be, for example, a sequence of numbers, a barcode, a 2-D barcode, a grid, or also a light code.

In the first variant of the identification apparatus 15, the identification element 19 is a camera, for example, which records, images, and relays the optically readable identification code in a way not explained in greater detail to the identification unit 18. If the identification code is a barcode, for example, the identification element 19 can be a corresponding barcode read apparatus, for example.

In the second variant of the identification apparatus 15, the identification element 19 is implemented, for example, as a phototransistor, a suitable transceiver element, or as a phototransistor and transmission diode. The identification element 15 receives the optical pulses or signals, which contain the identification code, from the transmission element 16 and relays them to the identification unit 18.

The first transmission path 24 can also be implemented as bidirectional in the second variant, wherein, for example, the identification element 19 transmits a start signal, receipt signal, query signal, or the like, which is generated by the identification unit 18, to the identification apparatus 15. The first transmission path 24 is preferably implemented as wireless and optical here.

Thus, for example, in the second variant having bidirectional first transmission path 24, the identification code can alternatively be requested so that a report means, for example, a colored LED, displays this request. A user can then input the identification code in greatly varying ways, for example, by button actuation (special button, button combinations, online via email, via mobile wireless by SMS, etc.), or cause the identification code to be provided and transmitted.

The identification unit 18 checks the identification code received from the identification element 19 and/or compares it to a value stored in the communication apparatus 17. If the identification code has been recognized in this manner, the communication control unit 17a carries out a release of the transmission unit 20 of the communication apparatus 17 for the establishment of the communication connection to the transmission apparatus 7 of the control device 5 of the electromotive furniture drive 2 via a second transmission path 25, which is bidirectional here. The second transmission path 25 is preferably a wireless radio path here, but can alternatively also be implemented as optical, for example, as an infrared path, acoustically, for example, ultrasound transmission, inductively, or capacitively.

The transmission apparatus 7 of the control device 5 of the electromotive furniture drive 2 is equipped with a transceiver for the second, bidirectional transmission path 25, to communicate with the transmission unit 20 of the communication apparatus 17.

The communication control unit 17a of the communication apparatus 17 in turn transmits the data of the data exchange via the connection 22 to the data device 21 and back. The connection 22 is also implemented as bidirectional here.

In this manner, an unambiguous assignment is performed between the data device 21 and the electromotive furniture drive 2 during the establishment of the communication connection. Furthermore, a synchronization of the data exchange via the second transmission path 25 is thus also ensured. An interruption of the control connection 26 by removing the operating apparatus 10 or installing or plugging in an additional wired connection is not necessary.

The first transmission path 24 and the second transmission path 25 are arranged in the first exemplary embodiment locally at different positions and are operated in chronological succession. I.e., the first transmission path 24 is arranged between the identification apparatus 15 of the operating apparatus 10 and the identification unit 18 of the communication apparatus 17, wherein the second transmission path 25 is arranged between the transmission apparatus 7 of the control device 5 and the transmission unit 20 of the communication apparatus 17.

The communication apparatus 17 can be implemented as an auxiliary part, for example, as a USB stick or a so-called dongle. To carry out the identification via the first transmission path 24, the communication apparatus 17 having the identification element 19 is placed on the operating apparatus 10 so that the identification element 19 is arranged on the transmission element 16 or is congruent therewith or has an optical visual connection thereto. Starting of the identification operation can be performed via the data device 21. It is also possible that the identification operation to establish the communication connection is only activated by actuating some type of switch operating element 12, 13 of the operating section 11 or an operating element (not shown) provided for this purpose of the operating apparatus 10.

Alternatively, the communication apparatus 17 can be completely or partially integrated in the data device 21, for example, a webcam of the data device 21 or another camera or a transceiver apparatus having Bluetooth wireless technology can be used as the identification element 19.

The established communication connection and data exchange operations can be displayed by one or more further display means.

FIG. 2 shows the schematic block diagram according to FIG. 1 having a second exemplary embodiment of the electromotive furniture drive 2 according to the invention.

In contrast to the first exemplary embodiment according to FIG. 1, in the second exemplary embodiment, the first transmission path 24 and the second transmission path 25 are locally arranged at the same position, wherein the second transmission path 25 runs via the control connection 26. The first transmission path 24 and the second transmission path 25 are also operated in chronological succession in the second exemplary embodiment, however.

Furthermore, it is preferable in the second exemplary embodiment that the first transmission path 24 and the second transmission path 25 between the identification apparatus 15 of the operating apparatus 10 and the identification unit 18 of the communication apparatus 17 are implemented as optical, bidirectional transmission paths.

The identification unit 18 and the transmission unit 20 of the communication apparatus 17 are connected to one another here via a transmission connection 27. The transmission connection 27 is a bidirectional transmission path, which is wire-bound here.

The identification operation occurs in the second exemplary embodiment, as in the first exemplary embodiment, via the first transmission path 24.

As soon as the identification by the identification unit 18 is completed, the release is performed via the communication control unit 17a to establish the communication connection, wherein the transmission unit 20 is activated. The transmission unit 20 is then connected by the transmission connection 27 to the identification unit 18 and transmits, by way of the second transmission path 24, which is now set up between the identification element 19 and the transmission element 16, and which previously formed the first transmission path 24, the respective data via the established communication connection. The communication connection to the transmission apparatus 7 of the control device 5 of the electromotive furniture drive 2 is established such that the control connection 26 is also used as the second transmission path. The second transmission path 25 therefore has three components, namely the wire-bound transmission connection 27, the optical first transmission path 24, and the wire-bound control connection 26.

In one variant, it is possible that the optical report display of the display apparatus 14 in the simple embodiment, for example, a light-emitting diode, is used as the transmission element 16.

Furthermore, the transmission element 16 having the identification apparatus 15 can, upon every actuation of a switch operating element 12, 13 of the operating section 11 of the operating apparatus 10, provide or transmit both the identification code and also, in chronological succession thereafter, the data values of a data exchange of the operating data. The transmission of the identification code and the data values is performed at such a high frequency that they are not recognizable to a user and only normal lighting of the display means is perceived.

Also in the second exemplary embodiment, re-plugging, replacement, or removal of the operating apparatus 10 or installing of a new wired connection to the data device 21 is not necessary to establish a communication of the electromotive furniture drive 2 to the data device 21.

Also in this case, the communication apparatus 17 can alternatively be completely or partially integrated in the data device 21, for example, a webcam of the data device 21 or another camera or a transceiver apparatus having Bluetooth wireless technology can be used as the identification element 19.

Figure 3:
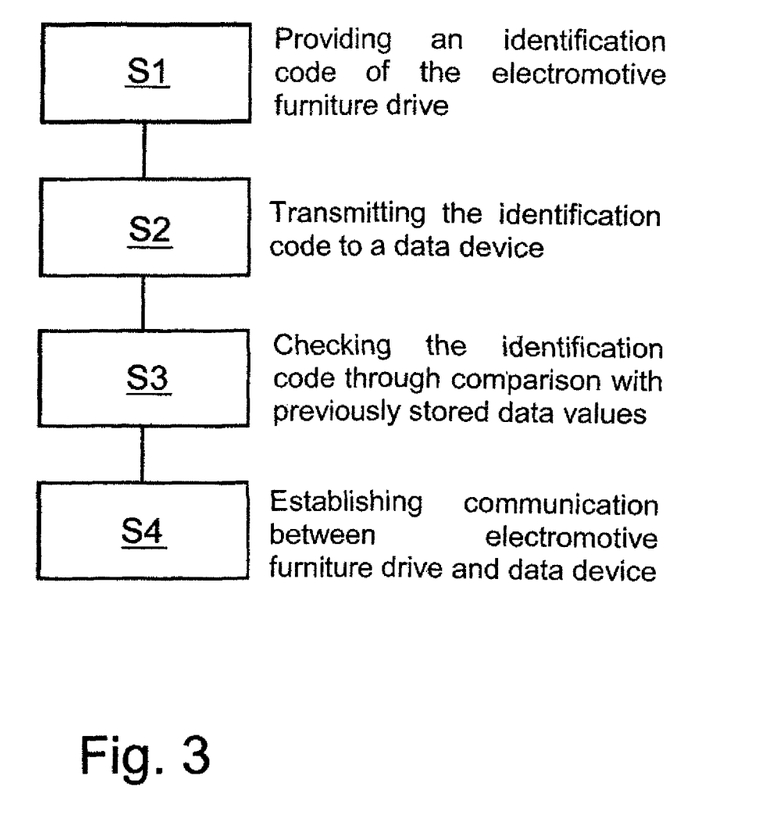
FIG. 3 shows a schematic flow chart of an exemplary embodiment of a method according to the invention.

FIG. 3 shows a schematic flow chart of an exemplary embodiment of a method according to the invention for establishing a communication connection between the electromotive furniture drive 2 of the piece of furniture 3 and the data device 21.

Firstly, in a first method step S1, an identification code of the electromotive furniture drive 2 of the piece of furniture 3 is provided. The provision can be performed automatically, however, it can also be requested in a menu-controlled manner by means of the data device 21, for example, wherein a corresponding display appears on the display screen of the data device 21, for example.

Then, in a second method step S2, a transmission of the identification code is performed via the first transmission path 24 between the identification apparatus 15 and the identification unit 18. The transmission is performed optically, as already described above.

In a third method step S3, a check of the received identification code is performed by means of comparison to previously stored data values. In the event of positive check result, an assignment of the identification code thus recognized of the electromotive furniture drive 2 to previously stored data is performed.

Finally, in a fourth method step S4, the communication connection between the electromotive furniture drive 2 of the piece of furniture 3 and the data device 21 is established, wherein the second transmission path 25 between the transmission unit 20 and the transmission apparatus 6 of the control device 5 of the electromotive furniture drive 2 is used.

The communication connection thus established between the electromotive furniture drive 2 of the piece of furniture 3 and the data device 21 also allows, for example, multiple pieces of furniture 3, which are present in a patient room, having identical or different electromotive furniture drives 2 to be unambiguously identified and assigned to the respective data device 21, also if the pieces of furniture 3 are in direct proximity to one another.

The above-described exemplary embodiments do not restrict the invention, which is modifiable in the scope of the appended claims.

The power supply apparatus 7 can be provided with an auxiliary power source, which can be, for example, a battery, a storage battery, and/or a capacitor. An emergency lowering function is therefore also possible. It is also possible that the power supply apparatus 7 is a battery and/or a storage battery.

It is also conceivable that the transmission apparatus 7 is arranged in the operating apparatus 10 in the second exemplary embodiment.

The invention claimed is:

1. A system, comprising:
   a piece of furniture, said piece of furniture including beds;
   an electromotive furniture drive having a control device and configured for installation in the piece of furniture;
   a data device integrated with a camera;
   a communication connection between the electromotive furniture drive and the data device, said communication connection having a first transmission path configured to transmit an identification code of the electromotive furniture drive, and a second transmission path configured to transmit control data and/or operating data of the electromotive furniture drive, wherein an identification apparatus is applied or attached as an identification code by a member selected from the group consisting of laser engraving, imprinting, an imprinted or embossed sticker, cutting shaping, reshaping (embossing), molding (injection molding in the case of an injection molded housing), color sequence, and color spectrum,
   wherein the identification code is recorded and imaged by the integrated camera,
   wherein the identification code is transmitted optically via the first transmission path; and
   a communication apparatus connected to the data device, said first and second transmission paths being arranged between the electromotive furniture drive and the communication apparatus,
   wherein the electromotive furniture drive includes the identification apparatus for the first transmission path and a transmission apparatus for the second transmission path, said communication apparatus having an identification unit for the first transmission path and a transmission unit for the second transmission path,
   wherein the first transmission path is arranged between the identification apparatus and the identification unit, wherein the second transmission path is arranged between the transmission apparatus and the transmission unit.

2. The system of claim 1, wherein the first transmission path is implemented as wireless, and the second transmission path is implemented as at least partially wireless.

3. The system of claim 1, wherein at least one of the first and second transmission paths is implemented as bidirectional.

4. The system of claim 1, wherein the electromotive furniture drive includes at least one operating apparatus, said identification apparatus being arranged in one of two ways, a first way in which the identification apparatus is arranged on or in the operating apparatus, a second way in which the identification apparatus is arranged or on or in a part of the electromotive furniture drive.

5. The system of claim 1, wherein the identification apparatus has a transmission element, said identification apparatus having a stored data value of an identification code and is implemented for an output of the identification code as an optical signal by the transmission element.

6. The system of claim 5, wherein the transmission element is a display light of the operating apparatus.

7. The system of claim 1, wherein the first transmission path is an optical transmission path, and the second transmission path is a radio path.

8. The system of claim 1, wherein the first and second transmission paths are arranged between the identification apparatus and the identification unit.

9. The system of claim 1, wherein the first and second transmission paths form a shared optical transmission path.

10. The system of claim 1, wherein the communication apparatus is implemented as a separate auxiliary part.

11. The system of claim 1, wherein the communication apparatus is at least partially integrated in the data device.

12. The system of claim 1, wherein the electromotive drive has an acquisition apparatus for acquiring operating data of the electromotive drive.

13. The system of claim 1, wherein the data device is a multimedia device having a touch screen.

14. A method for establishing a communication between an electromotive furniture drive of a piece of furniture including beds and a data device integrated with a camera, comprising the steps of:
   providing an identification code of the electromotive furniture drive of the piece of furniture by an identification apparatus of the electromotive furniture drive, wherein the identification apparatus is applied or attached as an identification code by a member selected from the group consisting of laser engraving, imprinting, an imprinted or embossed sticker, cutting shaping, reshaping (embossing), molding (injection molding in the case of an injection molded housing), color sequence, and color spectrum;

recording and imaging the identification code by the integrated camera;

transmitting the identification code via a first transmission path between the identification apparatus and an identification unit of a communication apparatus of the data device, wherein the identification code is transmitted optically via the first transmission path;

identifying the electromotive furniture drive by checking the identification code received via the first transmission path;

establishing a communication connection between the electromotive furniture drive of the piece of furniture and the communication apparatus of the data device by using a second transmission path between a transmission apparatus of the electromotive furniture drive and a transmission unit of the communication apparatus of the data device; and transmitting control data and/or operating data of the electromotive furniture drive via the second transmission path.

15. The method of claim 14, wherein the identification code is provided automatically or in a menu-controlled manner by the data device.

16. The method of claim 14, wherein the identification code is transmitted through imaging using an optical device.

17. The method of claim 14, wherein the transmitting step includes reading of the identification code by a user and input via a keyboard.

18. The method of claim 14, wherein the identification code is transmitted by light signals.

19. An electromotive furniture drive, comprising:
a control device to control operation of a piece of furniture including beds;
a power supply apparatus configured to supply electric energy to the control device;
an operating apparatus configured to operate the control device;
a communication connection for data exchange between the electromotive furniture drive and a data device, said data device being integrated with a camera;
an identification apparatus to transmit a first set of data via a first transmission path of the communication connection, wherein the identification apparatus is applied or attached as an identification code by a member selected from the group consisting of laser engraving, imprinting, an imprinted or embossed sticker, cutting shaping, reshaping (embossing), molding (injection molding in the case of an injection molded housing), color sequence, and color spectrum, wherein the identification code is recorded and imaged by the integrated camera;
a transmission apparatus to transmit a second set of data via a second transmission path of the communication connection,
wherein the identification code is transmitted optically via the first transmission path; and
a communication apparatus connected to the data device, said first and second transmission paths being arranged between the electromotive furniture drive and the communication apparatus,
wherein the electromotive furniture drive includes the identification apparatus for the first transmission path, said communication apparatus having an identification unit for the first transmission path and a transmission unit for the second transmission path,
wherein the first transmission path is arranged between the identification apparatus and the identification unit, wherein the second transmission path is arranged between the transmission apparatus and the transmission unit.

* * * * *